May 26, 1931.  R. G. ANDERSON  1,807,024

METHOD OF EMBOSSING RUBBER

Original Filed March 6, 1923

INVENTOR
Roland G. Anderson
BY Ernest Hopkinson
ATTORNEY

Patented May 26, 1931

1,807,024

UNITED STATES PATENT OFFICE

ROLAND G. ANDERSON, OF NEW HAVEN, CONNECTICUT, ASSIGNOR, BY MESNE ASSIGN-
MENTS, TO WELLMAN COMPANY, OF MEDFORD, MASSACHUSETTS, A CORPORATION
OF MAINE

METHOD OF EMBOSSING RUBBER

Original application filed March 6, 1923, Serial No. 623,141. Divided and this application filed October 18,
1927. Serial No. 227,001.

This invention relates to the formation of raised characters upon rubber composition, and more particularly to a method of and a die for embossing emblems or other indicia upon unvulcanized rubber composition.

It has been customary to form stamped or depressed characters in rubber by the use of an ordinary stamp, but in subsequent operations of varnishing or vulcanizing or both, the depressions are partly filled up and rendered more or less illegible. It is also known to form raised or embossed characters upon unvulcanized rubber composition by means of compressing the composition between two cooperating dies one of which is provided with a plurality of projecting ribs upon its surface and the other of which is provided with a plurality of grooves which are adapted to cooperate with the ribs of the first mentioned die. The dies effect a punching or embossing of a portion of the rubber composition laterally of the main body of rubber composition. If these dies are brought together under sufficiently heavy pressure to cause sufficient flow of the rubber stock to form the desired emblem, the stock escapes from between the dies and the material becomes so thinned and weakened as to render defective sheet material on which the embossing is placed. On the other hand owing to the elastic nature of the rubber composition, if a light pressure be used the composition does not flow sufficiently but merely stretches into the recesses of the female die and when the pressure is released the rubber composition stretches back again so that a defective and improperly filled out embossed design is formed. A further objection is that recesses are formed in the stock at the back of the embossing, and when the embossed stock is plied up on other material when building up an article, in the subsequent vulcanization of the article air pockets form in the recesses of the back of the embossed stock which constitute blisters in the completely vulcanized article. Also during vulcanization, the rubber of the embossed portion of the article tends more or less to flow back into the recesses and the characters to become obliterated.

This application is a divison of my Patent No. 1,691,795, dated November 13, 1928.

It is an object of this invention to emboss by the use of a single die. Still another object is to provide an improved method of embossing unvulcanized rubber and similar materials. Another object is to provide an improved die by means of which raised or embossed characters can be formed upon the surface of unvulcanized rubber stock in such a way as to be substantially permanent. Another object is to emboss one side of an unvulcanized sheet of rubber stock while maintaining the opposite side of the sheet unbroken in outline. Other objects will be apparent from the specification and from the accompanying drawings in which:

Figure 1:
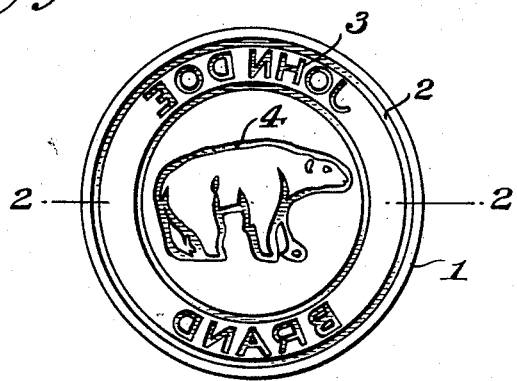
Fig. 1 is a plan view of one type of embossing die carrying a plurality of recessed figures and designs therein.
Figure 2:
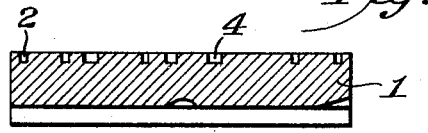
Fig. 2 is a section along the line 2—2 of Fig. 1.
Figure 3:
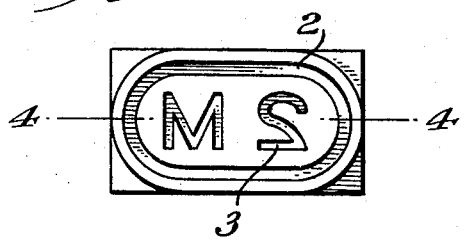
Fig. 3 is a plan view of a die for embossing size indicia, etc.
Figure 4:
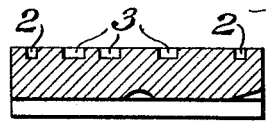
Fig. 4 is a section along the line 4—4 of Fig. 3.

Referring particularly to Figs. 1 and 2 of the drawings, the die comprises a body portion 1 having a flat embossing face in which there is provided a continuously extending recess 2 which extends around the face of the die in spaced relation to and concentric with the edges thereof forming in effect a frame for the recesses which are to constitute the main characters of the die. Within the circumference of recess 2 in the embossing face of the die there are provided a plurality of recesses 3 which form characters such as letters or figures as may be desired. Other recesses 4 outlining distinctive emblems or other designs can be formed in the face of the die. In Figs. 3 and 4 there is illustrated an application of the principles of construction previously described in connection with Figs. 1 and 2 when applied to a die of smaller size used for example in embossing size numbers upon sheet rubber composition. This die is also provided with a continuous recess 2 extending around the face of the die in spaced relation to the edges thereof. Enclosed within the recess 2 there are provided recesses 3 forming figures or letters or both as may be desired.

In the operation of using the die for embossing characters upon unvulcanized sheet rubber composition the die is pressed against the composition with a pressure of approximately 400 lbs. per sq. in., the backing or support for the composition being provided with a plane surface. The pressure can be varied within reasonable limits depending upon the size of the die which is used. It is intended to use sufficient pressure to cause the rubber composition to flow into the grooves of the die with sufficient momentum to overcome the elasticity of the rubber composition and consequently to assume a set condition projecting outwardly from the surrounding rubber composition. In effecting the embossing operation the recess 2 serves as a retaining means which prevents the rubber composition opposite the face of the die from flowing laterally away from the die and as a consequence the pressure causes the rubber within the circumference of recess 2 to flow laterally and vertically into the recesses 3 and 4.

By the use of the die disclosed, the rubber composition is provided with a plurality of raised characters upon its surface and at the same time is not appreciably thinned and the back surface of the rubber article is maintained unbroken. The rubber composition of the embossing having assumed a set condition and the rear surface of the stock at the base of the characters being unbroken in outline the stock of the characters does not tend to flow appreciably during vulcanization and thereby dull their outlines.

While the invention has been particularly described as applied to the embossing of unvulcanized rubber composition, it will be understood that other plastic compositions may be used and some of the advantages of the invention realized. Also the recesses within the retaining recess at the edge of the die can be considerably varied in their form and size and area as may be desired.

Having thus described my invention, what I claim and desire to protect by Letters Patent is:

1. That method of embossing an unvulcanized sheet of previously calendered rubber composition, which consists in supporting one face of the sheet substantially flat throughout an area greater than the area to be embossed, and applying an embossing die to the opposite face of said sheet at a pressure per square inch on the face of the area outlining the configuration of the mark of not less than 400 pounds when the stock is at approximately room temperature to form a permanent design therein with portions of the design upstanding from the face on which it is formed and without deformation of the opposite supported face of said sheet.

2. The method of embossing unvulcanized sheet rubber which comprises arranging the sheet rubber on a smooth surfaced support, moving a female embossing die into contact with the surface of the sheet rubber, applying pressure through the die in excess of 400 lbs. per sq. in. to areas outlining the configuration of the mark to be formed so as to cause the unvulcanized rubber to flow into the recesses of the die and to be stretched beyond its elastic limit.

Signed at New Haven, county of New Haven, State of Connecticut, this 12 day of October, 1927.

ROLAND G. ANDERSON.